US008152100B2

(12) United States Patent
Nicholas et al.

(10) Patent No.: US 8,152,100 B2
(45) Date of Patent: Apr. 10, 2012

(54) AMPHIBIOUS SPORT AIRCRAFT TRAILER

(75) Inventors: Paul Nicholas, Burbank, CA (US); Kirk Hawkins, Los Angeles, CA (US); Matthew Gionta, Tehachapi, CA (US)

(73) Assignee: ICON Aircraft, Inc., Los Angeles, CA (US)

( * ) Notice: Subject to any disclaimer, the term of this patent is extended or adjusted under 35 U.S.C. 154(b) by 336 days.

(21) Appl. No.: 12/482,277

(22) Filed: Jun. 10, 2009

(65) Prior Publication Data
US 2009/0309328 A1 Dec. 17, 2009

Related U.S. Application Data

(60) Provisional application No. 61/060,797, filed on Jun. 11, 2008.

(51) Int. Cl.
*B60P 3/11* (2006.01)

(52) U.S. Cl. .................. 244/110 R; 114/261; 114/262; 414/471; 414/482

(58) Field of Classification Search ............... 114/261, 114/262; 414/471, 482; 244/110 R
See application file for complete search history.

(56) References Cited

U.S. PATENT DOCUMENTS

| 3,119,502 | A | * | 1/1964 | Paul | 414/474 |
|---|---|---|---|---|---|
| 3,503,357 | A | * | 3/1970 | Ferris | 114/262 |
| 3,870,339 | A | * | 3/1975 | Goff | 280/414.1 |
| 4,068,772 | A | * | 1/1978 | Prudhomme | 414/477 |
| 4,221,420 | A | * | 9/1980 | Vencill et al. | 410/24 |
| 4,406,477 | A | * | 9/1983 | McDonald | 280/414.1 |
| 4,469,346 | A | * | 9/1984 | Low | 280/414.1 |
| 4,589,814 | A | * | 5/1986 | Cates | 414/484 |
| 4,592,694 | A | | 6/1986 | Johnson | |
| 4,653,706 | A | * | 3/1987 | Ragiab | 244/110 E |
| 4,673,328 | A | | 6/1987 | Shiels | |
| 4,702,662 | A | | 10/1987 | Marlett | |
| 4,749,317 | A | * | 6/1988 | Daniel | 410/26 |
| 4,784,545 | A | * | 11/1988 | Lawrence | 410/26 |
| 4,880,250 | A | * | 11/1989 | Cravens et al. | 280/414.1 |
| 4,932,830 | A | * | 6/1990 | Woodburn | 414/495 |
| 5,131,342 | A | | 7/1992 | Sackett | |
| 5,380,143 | A | * | 1/1995 | Mohan | 414/495 |
| 5,468,115 | A | * | 11/1995 | Alvis | 414/556 |
| 5,772,388 | A | * | 6/1998 | Clark | 414/484 |
| 5,863,173 | A | * | 1/1999 | Bremner | 414/462 |
| 6,217,053 | B1 | * | 4/2001 | Forsythe et al. | 280/414.3 |
| 6,257,167 | B1 | * | 7/2001 | Joaquim | 114/344 |
| 6,298,802 | B1 | * | 10/2001 | Brignolio | 114/344 |
| 6,648,578 | B1 | * | 11/2003 | Rouse | 414/482 |
| 7,134,829 | B2 | | 11/2006 | Quenzi et al. | |
| 7,243,979 | B1 | * | 7/2007 | Stene et al. | 296/168 |
| 7,344,344 | B2 | * | 3/2008 | Davis | 410/77 |
| 7,503,274 | B2 | | 3/2009 | Weed et al. | |
| 2008/0213074 | A1 | | 9/2008 | Garcia et al. | |
| 2008/0276851 | A1 | | 11/2008 | Weed, Jr. et al. | |

* cited by examiner

*Primary Examiner* — James Keenan
(74) *Attorney, Agent, or Firm* — Martensen IP; Michael C. Martensen

(57) ABSTRACT

An amphibious aircraft trailer includes a frame supported on a wheel/suspension bearing axle for movements over a roadway surface. Incorporated into the trailer is a cradle configured to engage a hull of the amphibious aircraft when it is loaded and unloaded in water conditions. A lift mechanism interposed between and coupled to the frame and the cradle is operable to displace the cradle vertically with respect to the frame such that landing gear associated with the amphibious aircraft can be extended or retracted while on the trailer. The trailer may also include a plurality of wheel tracks aligned with the landing gear to facilitate the aircraft's loading and unloading in its ground based mode of operation.

16 Claims, 4 Drawing Sheets

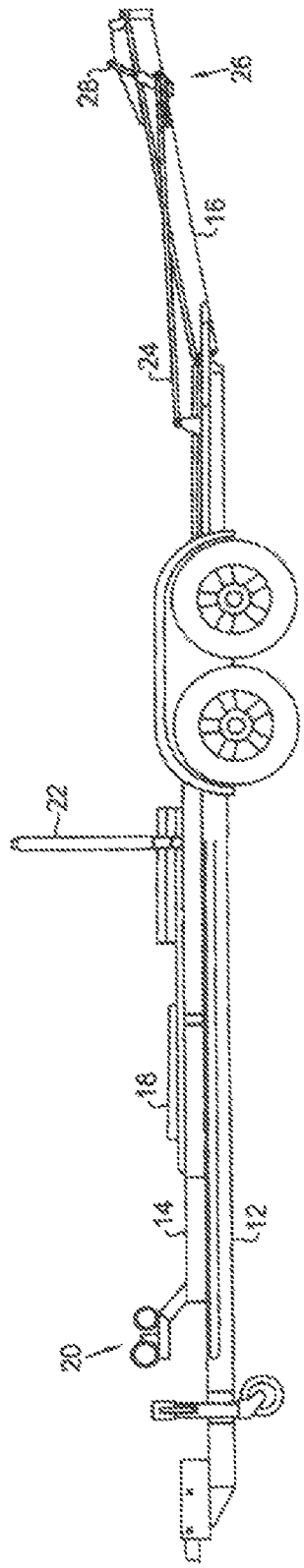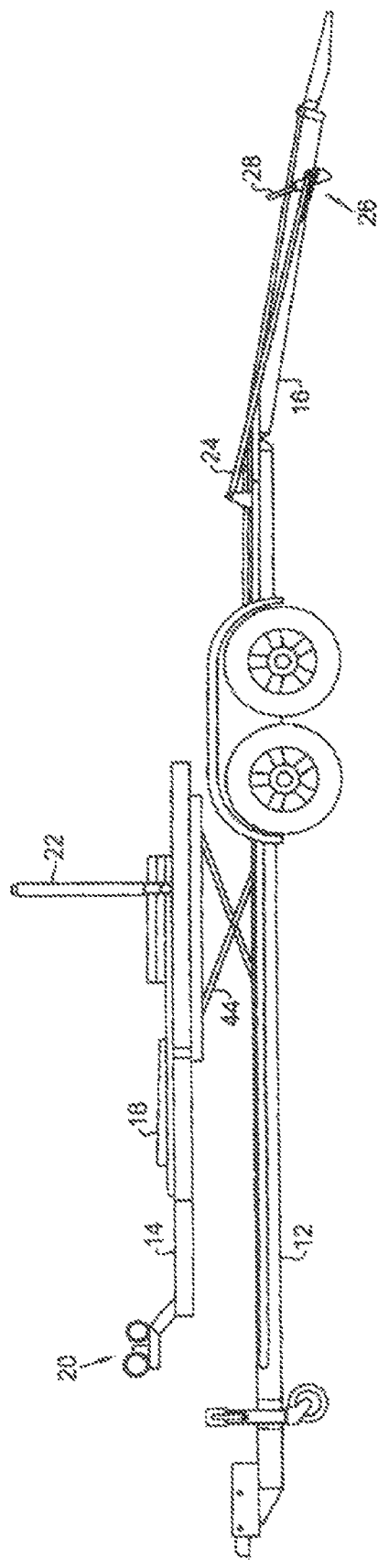

AMPHIBIOUS SPORT AIRCRAFT TRAILER

RELATED APPLICATION

The present application relates to and claims the benefit of priority to U.S. Provisional Patent Application No. 61/060,797 filed Jun. 11, 2008, which is hereby incorporated by reference in its entirety for all purposes as if fully set forth herein.

BACKGROUND OF THE INVENTION

1. Field of the Invention

Embodiments of the present invention relate, in general, to a trailer for an amphibious aircraft and more particularly to a trailer acting as both a transport device and a transition device between land and sea operations.

2. Relevant Background

Recreational and sport aviation possess numerous similarities to recreational boating with at least one dramatic difference. That difference is the ability to conveniently transport and store the aircraft. Recreational boating has been a favorite pastime throughout our history, but it evolved from a time in which boating was restricted to a privileged few. Lakes, rivers, and seas offer numerous opportunities for boating enjoyment and with the addition of one's own automobile and a boat trailer, an individual can easily convey his recreational boat or vessel between his home and the water. Until the introduction of the boat trailer, however, recreational boating was largely restricted to those who could afford to house or store their boats on or near the water.

The introduction of transportable water craft resulted in an explosion in recreational boating. Now individuals living miles from a body of water could enjoy the pleasures of boating without having to incur the high cost of storage and contract maintenance. A boat of a modest size could be placed on a trailer, stored at home and transported to and from a body of water when desired. Numerous designs of various types of boat trailers exist in the prior art, some dating back decades. Many of the prior art designs are specific to a particular type of boat or vessel while others serve a specific function such as the maintenance of a boat's hull.

Despite various types of designs for boat trailers, each typically possesses a frame on which a bed of either rollers or platforms exist to support the boat as it floats onto the trailer. The frame includes a set of wheels or a suspension system that can be hitched to a vehicle for towing.

As with recreational boating, other forms of trailers have been designed and utilized to transport recreational vehicles to the environment in which they are employed. For example, horse trailers transport horses to areas in which the rider wishes to explore. Similarly, all terrain vehicles are transported to wilderness areas in which adventure seekers wish to experience nature.

As in the early days of boating when boats were tied to lakes or rivers, recreational aircraft today are tied to airports or seaports. Owners of small or sport aircraft store their aircraft in hangers or on-ramp space at local airports. Maintenance is carried out at the local airport; and any time the individual wants to take a flight, the individual must first go to the airport or seaport to retrieve the aircraft. This aspect of recreational flying has long restricted the ability for the recreational aircraft industry to mirror that of other recreational industries. Recreational flying today is simply not convenient.

Similar to what occurred in recreational boating with the introduction of trailers, the introduction of a recreational amphibious aircraft and an associated trailer may now be available to a large number of individuals. A recreational amphibious aircraft is an aircraft which can both be launched and flown as a seaplane as well as operated as a conventional land based aircraft. This type of aircraft, however, is designed not to be stored necessarily at an airport but rather in a home garage or at a local storage facility. As with recreational boating, the amphibious aircraft must be transported to and from its intended point of departure with a trailer that must be versatile enough to launch and retrieve the aircraft in both its water configuration as well as its land configuration. Such a trailer has been a challenge to develop.

In the past, amphibious aircraft have been transported by first using a crane to lift the aircraft out of the water and place it directly on a trailer or by pulling the aircraft out of the water, as one would a boat, and then placing it on the trailer in a separate step. Similarly when an amphibious aircraft arrived at water via trailer, it would have to be lifted off the trailer via a crane or similar device and placed directly into the water. This process is time consuming and expensive. There remains a need for a trailer that can both recover and launch an amphibious aircraft in its seaplane configuration, transport the aircraft, and provide an interface so as to launch and recover the aircraft in its land configuration. These and other challenges to the prior art are overcome by one or more embodiments of the present invention.

SUMMARY OF THE INVENTION

Described hereafter, by way of example, are one or more embodiments of an amphibious aircraft trailer. The amphibious aircraft trailer of the present invention enables an amphibious aircraft to be retrieved from a boat ramp as may be found in a lake or river and transported for storage to a garage or local storage facility. Furthermore the amphibious aircraft trailer of the present invention allows an owner to raise the aircraft while it resides on the trailer so that the landing gear may be extended allowing the aircraft to be removed and employed as a land-based aircraft.

According to one embodiment of the present invention, the amphibious aircraft trailer includes a frame supported on a wheel/suspension bearing axle for movements over a roadway surface. The trailer may also include a plurality of wheel tracks aligned with the landing gear to facilitate the aircraft's loading and unloading in its ground based mode of operation. Incorporated into the trailer is a cradle configured to engage a hull of the amphibious aircraft when it is loaded and unloaded in water conditions. A lift mechanism interposed between and coupled to the frame and the cradle is operable to displace the cradle vertically with respect to the frame such that landing gear associated with the amphibious aircraft can be extended or retracted while on the trailer.

According to one embodiment of the present invention, the amphibious aircraft trailer includes a plurality of bunks on which the amphibious aircraft can slide into position while being loaded from water. The cradle can also comprise a plurality of wheels or rollers which may aid in the loading and unloading of the aircraft. The bunks or rollers of the trailer are positioned such that upon raising the cradle the landing gear of an aircraft resting thereon can be extended or retracted without interference. In one embodiment of the present invention the lift mechanism can be a scissor lift operated by a mechanical drive, or in another embodiment of the present invention the lift mechanism can be electric, hydraulic, pneumatic or any other lifting mechanism suitable for lifting substantial weight using as would be known to one skilled in the relevant art.

According to this and other embodiments of the present invention, the amphibious aircraft trailer includes a ramp positioned at the rear of the trailer which can be raised or lowered to facilitate the loading or unloading of the aircraft while the aircraft is configured for land operations. The ramp also can be positioned to an upward angle to facilitate unloading or loading while the aircraft is configured for sea operations and to aid in travel over uneven terrain.

While in one version of the present invention the lift mechanism is a scissor lift allowing the aircraft to be displaced vertically, another embodiment of the present invention elevates the aircraft and cradle portion from the rear of the trailer in an angular fashion; this method also allows the landing gear to be extended. Thereafter the aircraft is repositioned on the guide tracks to allow the aircraft to be removed from the trailer in a land configuration.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 2 is a side view of one embodiment of an amphibious aircraft trailer showing the trailer with the bunks lowered and the ramp raised according to the present invention;

FIG. 3 is a side view of one embodiment of an amphibious aircraft trailer showing the trailer with the bunks raised and the ramp lowered according to the present invention;

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Embodiments of the present invention comprise an amphibious aircraft trailer which can be used to transport an amphibious aircraft to either a land-based or a water-based point of departure or recovery. An amphibious aircraft is one which can land or take off from either land or water. The present invention allows a user to land his aircraft on one medium, for example water, transport the aircraft to another location and launch it on another medium, for example land. The present invention incorporates unique features which permit a user to quickly and easily launch and recover an aircraft in the water, extend the landing gear, and then unload the aircraft on land or vice versa. For purposes of the present invention, an amphibious aircraft operating in the water with the landing gear retracted is hereafter referred to as a water or waterborne configuration. Similarly, the amphibious aircraft with landing gear extended is understood to be in a land or land based configuration.

Figure 1:
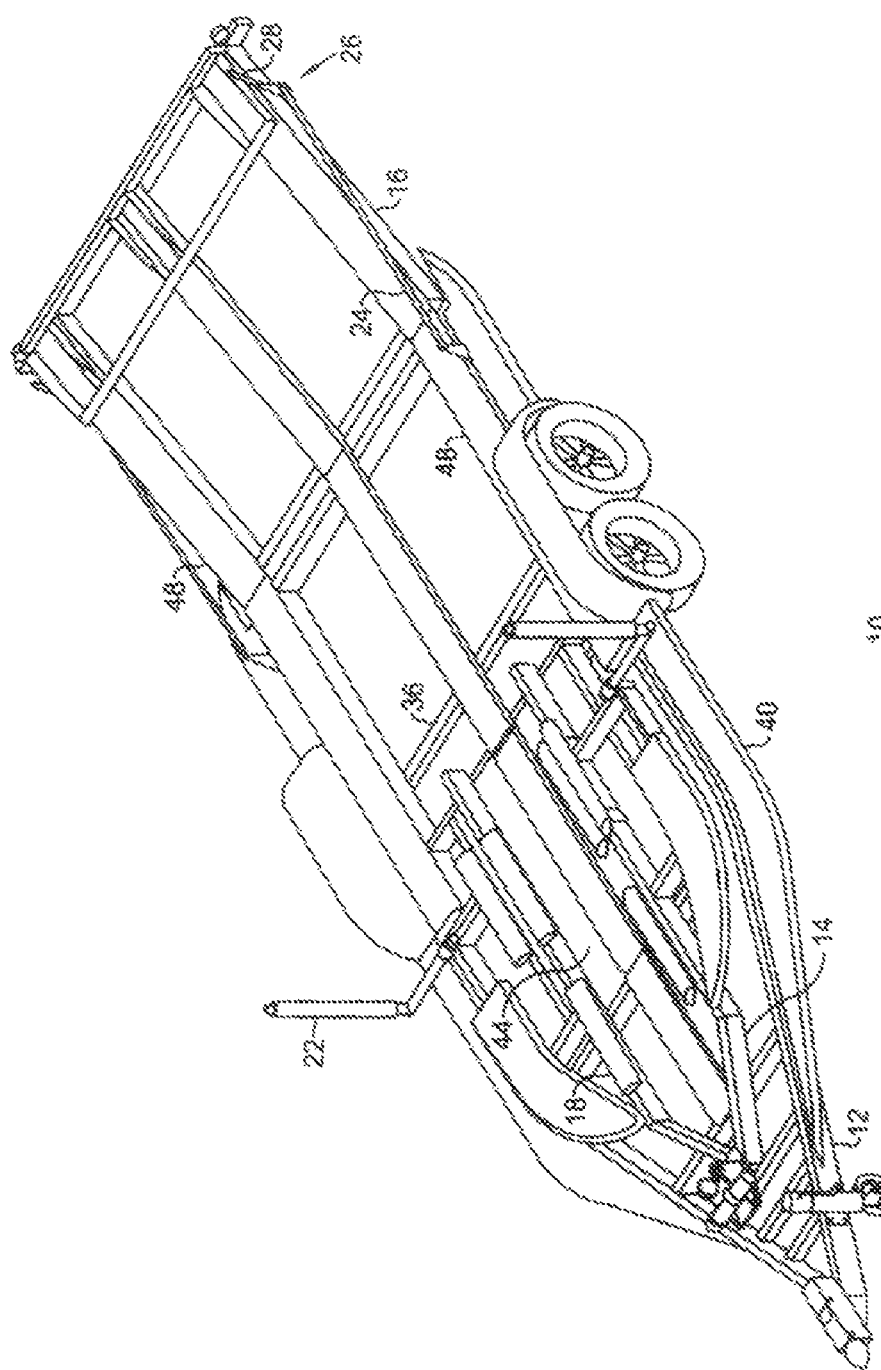
FIG. 1 is an isometric view of one embodiment of an amphibious aircraft trailer having movable bunks and a movable ramp according to the present invention.

FIG. 1 is an isometric view of one embodiment of an amphibious aircraft trailer having movable bunks and a movable ramp according to the present invention. As shown, the trailer 10 includes an outer frame 12 and a bunk frame 14. The bunk frame 14 includes a plurality of bunks 18 on which the aircraft resides. The outer frame 12 further includes a plurality of guide tracks 48, 49 aligned with the wheels of the aircraft when the aircraft is positioned on the trailer. For loading and unloading the aircraft during land-based operations the rear portion of the trailer includes a ramp which can be raised and lowered to facilitate loading and unloading. The trailer further includes a plurality of guides 22 which aid in guiding the aircraft to be aligned with the bunks 18 when the aircraft is being loaded during water operations. The guides 22 are positioned so as to not interfere with the wings of the aircraft be they be in the deployed or stored configuration. Furthermore the trailer of the present invention enables loading and unloading of the aircraft with the wings either extended or retracted.

As shown in FIG. 1, the trailer further includes typical features (not shown) which one skilled in the relevant art would expect to find on a trailer. For example, the trailer would include a receiver for a hitch which would allow the trailer to be towed behind a vehicle such as an automobile. The trailer further includes a plurality of tires to carry the load of the aircraft as well as a winch, which is common on boat trailers, to facilitate the loading and unloading of the vessel during sea operations.

FIG. 2 shows a side view of an amphibious aircraft trailer according to one embodiment of the present invention. As previously described, the trailer includes an outer frame 12 and a bunk frame 14 on which bunks 18 enable an aircraft to reside and be transported. Associated with the bunks 18 and the bunk frame 14 is a winch 20 which assists in positioning the aircraft into the location for transport when the aircraft is being loaded or unloaded. The bunk frame 14 also includes a plurality of platforms which raise and lower with the bunk frame 14 enabling a user to easily gain access to the cockpit for extension and retraction of the landing gear. FIG. 2 further shows the loading and unloading ramp 16 as well as the operational components which control the lowering and raising of the ramp during land operations. The ramp includes a lock rod 24 as well as a ramp locking mechanism 26 and a locking shaft 28. Unlike boats, the center of gravity of the amphibious aircraft resides relatively forward of the aircraft's overall length, whereas in a boat the center of gravity usually resides at the rear near the location of the boat's engine. Thus the positioning of the wheels on the amphibious aircraft trailer is relatively forward of where the same wheels would be positioned on a boat trailer. According to one embodiment of the present invention the winch 20 assists in controlling any tipping tendency during loading and unloading of the aircraft when positioning of the aircraft on the trailer using the ramp. The ramp, which is necessary to load and unload the aircraft for land operations, extends the trailer away from the wheels such that the ramp end may interfere or contact a driveway or similar obstruction. To eliminate such interference the ramp is angled upward with respect to the trailer frame 12 at approximately a 10° angle during transport. Furthermore the ramp can be lowered to accommodate various trailer height and angle configurations for land based loading and unloading and, when combined with the winch, to aid in control of the aircraft's stability as the aircraft is moved on and off the trailer.

FIG. 3 shows a side view of the amphibious aircraft trailer configured with the bunk frame and cradle in a raised position according to one embodiment of the present invention. As shown, the outer frame 12 remains in a stable position while the bunk frame 14 is vertically displaced by a scissor mechanism 44. While in this embodiment a scissor mechanism is used to raise and lower the bunks 18, one skilled in the relevant art will recognize that the lifting mechanism can be one of or a combination of other means that can reliably raise and lower the bunk frame 14 with respect to the trailer frame 12. FIG. 3 also shows the ramp 16 in its lowered position, which can facilitate the aircraft being loaded or unloaded for ground operations. The scissor mechanism 44 is positioned, according to one embodiment of the present invention, between the receiver hitch and the wheels of the amphibious aircraft trailer. The scissor mechanism 44 is also positioned so as to be substantially underneath or below the center of gravity of the aircraft when the aircraft is properly aligned with the bunks 18 on the bunk frame 14.

Figure 4:
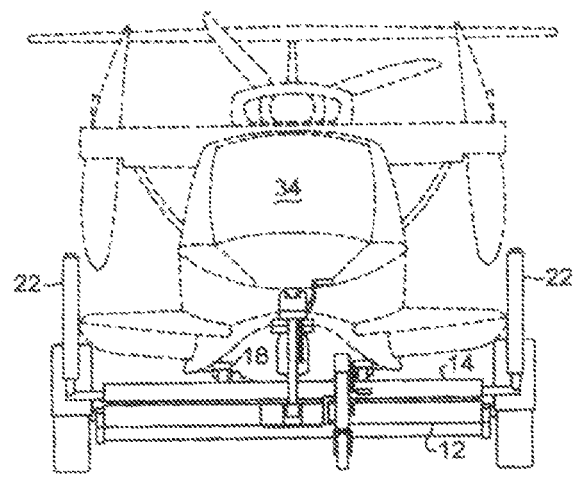
FIG. 4 is a front view of one embodiment of an amphibious aircraft trailer with an aircraft resting on bunks in their lowered position according to the present invention.

FIG. 4 is a front view of the amphibious aircraft trailer with an aircraft residing on the bunks according to one embodiment of the present invention. The aircraft 34 resides on the bunks 18 which are coupled to the bunk frame 14. The bunk frame rests on the outer frame 12 of the amphibious aircraft trailer in its lowest position during transport. FIG. 4 further shows the alignment of the guides 22 with respect to the aircraft 34 when the aircraft is in the proper position for transport. According to another embodiment of the present invention, the center track 49, which is aligned with the nose gear of this embodiment of the aircraft when extended, is lowered with respect to the outer tracks 48 to increase the clearance between the track 49 and keel of the aircraft. In another embodiment the center track 49 can be aligned with an aircraft's tail wheel. This lowering of the center track 49 enables the amphibious aircraft to reside on the bunks 18 in a lower position and thus lowers the center of gravity of the aircraft and the entire center of gravity of the trailer with respect to the wheels of the trailer to provide a more stable and safer towing platform.

Figure 5:
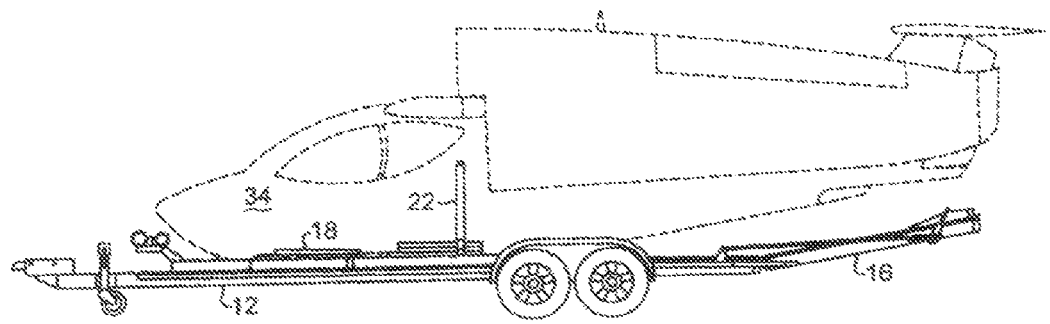
FIG. 5 is a left perspective view of one embodiment of an amphibious aircraft trailer with an aircraft resting on bunks in their lowered position according to the present invention.

FIG. 5 is a left perspective view of the amphibious aircraft trailer according to one embodiment of the present invention showing a loaded aircraft resting on the bunks in its lowered position. The aircraft 34 is guided into position by the guides 22 to a resting position on the bunks 18 during water operations, which thereafter reside on the aircraft trailer's outer frame 12. For transport the ramp 16 is put into a raised position to facilitate a protective barrier behind the tail of the aircraft and to allow the aircraft trailer to traverse various driveways, ramps, speed bumps or other uneven terrain.

Figure 6:
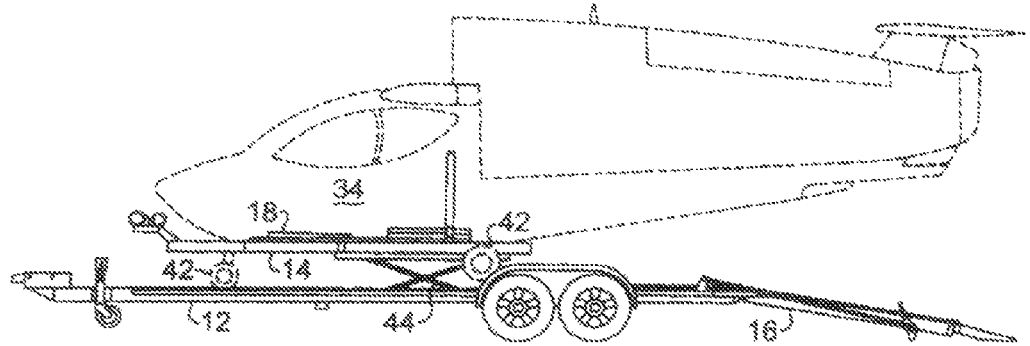
FIG. 6 is a perspective view of one embodiment of an amphibious aircraft trailer with an aircraft resting on bunks in their raised position with landing gear extended according to the present invention.

FIG. 6 is a left perspective view of the amphibious aircraft trailer of FIG. 5 with the bunks 18 in a raised position according to one embodiment of the present invention. As shown in this depiction, the aircraft 34 resting on the bunks 18 is raised above the amphibious aircraft trailer frame 12 such that the wheels 42 and landing gear of the aircraft can be extended. The landing gear of the aircraft 42 is extended with wheels aligned with the wheel tracks 48, 49 (not shown) that reside on the amphibious aircraft trailer. Again the center of gravity of the aircraft 34 while positioned on the bunks 18 is vertically aligned over the lift mechanism which displaces the weight of the aircraft. With the landing gear extended the aircraft 34 can be lowered until the wheels 42 make contact with the tracks 48, 49.

Figure 7:
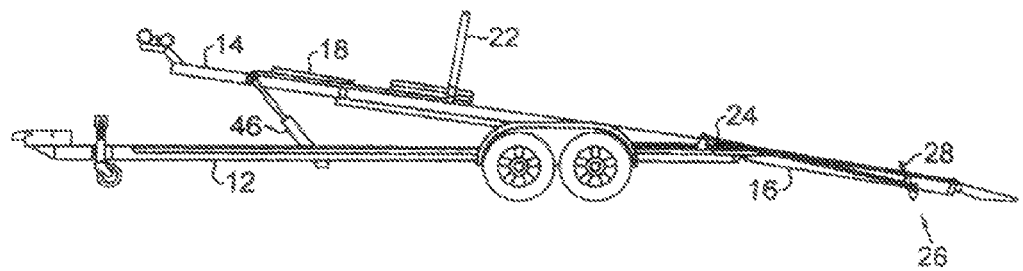
FIG. 7 is a side view of another embodiment of the present invention of an amphibious aircraft trailer showing a tilting mechanism.

FIG. 7 shows another embodiment of an amphibious aircraft trailer according to the present invention. As with the previous embodiment, the amphibious aircraft trailer includes an outer frame 12 and a ramp 16 located at the rear of the trailer. In this embodiment of the present invention, the bunk frame 14 and the bunks 18 are associated with a cantilever which is attached to the lower frame 12 at the rear portion of the trailer near the location where the ramp 16 is attached. Associated with the bunk frame 14 is a hydraulic or pneumatic lift 46 or similar device which vertically displaces the front of the bunk frame 14 at an angle so as to gain a vertical displacement sufficient for the aircraft landing gear to be extended or retracted while the aircraft 34 is positioned on the trailer.

In this embodiment, when the bunk frame 14 is in its upper or extended configuration, the landing gear of the aircraft can be extended. With the landing gear extended, the lifting device 46 can lower the bunk frame 14 so that the wheels 42 make contact with the tracks 48, 49. Then, with the bunk frame 14 and bunks 18 positioned in the lowest mode of operation, the aircraft can be unloaded via the tracks 48, 49 and ramp 16.

Likewise during land operations the aircraft can be loaded via the ramp 16 and tracks 48, 49 and positioned directly above the bunk frame 14 and bunks 18. Once in position the bunk frame 14 can be lifted until the bunks 18 make contact with the aircraft thus lifting the aircraft 34 and associated landing gear off the tracks 48, 49. Once weight is off the landing gear, the landing gear can be retracted and the bunk frame 14 returned to its lower state for transport of the aircraft or water launching.

In yet another embodiment of the present invention (not shown) the lift mechanism is a formed by a four bar linkage system that causes the bunk frame 14 to rotate as a unit into a raised position. Similarly the entire bunk frame 14 from the raise position rotates as a unit to a lower position. During the rotation of the plurality of links or linkage components there is a certain degree of forward or rearward motion however the displacement is minimal and only occurs during the raising and lowering motions. The rotation of the linkage components can be powered by electromechanical, hydraulic, pneumatic, or similar lifting power sources as would be well known to one skilled in the relevant art.

To minimize movement of the aircraft during transport, the amphibious aircraft should travel with the bunks 18 and bunk frame 14 in their lower position and with the landing gear of the aircraft retracted. As with trailers of the prior art, tie-downs are included to enable the aircraft to be securely positioned and fastened to the trailer during transport. The tie-downs are attached to the bunk frame 14 rather than the trailer frame 12. Accordingly the aircraft can be securely raised or lowered on the bunk frame 14 without fear of damage to the aircraft due to a shifting center of gravity, wind interactions, environmental slope of the trailer, or other external conditions that may cause damage to the aircraft or make the aircraft's interaction with the trailer less certain.

Figure 8:
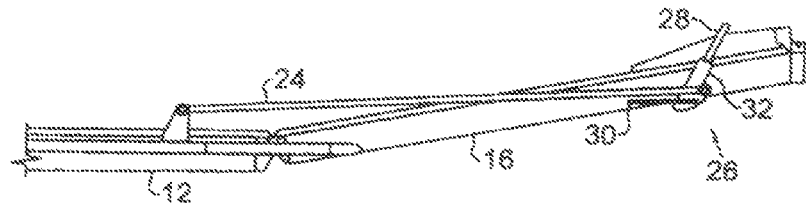
FIG. 8 is an expanded isometric view of the ramp of FIG. 5 and its locking mechanism, with the ramp in the raised position according to one embodiment of the present invention.

FIG. 8 shows an expanded side view of the ramp located at the rear portion of the amphibious aircraft trailer according to one embodiment of the present invention. As shown the ramp 16 is in a raised position with respect to the trailer frame 12. The raising and lowering of the ramp 16 is accomplished via a locking mechanism 26 which includes a lock shaft 28 coupled to a quick release pin 32. The locking mechanism 26 includes an over-center spring 30 and a lock rod 24 that couples the ramp 16 to the trailer frame 12. To load or unload the aircraft on land, the user removes the quick release pin 32 from the ramp locking mechanism 26 and rotates the lock shaft 28 away from its locked position. When the lock shaft 28 has rotated past its center position, the weight of the ramp 16 will allow the ramp to be lowered to the ground. The aircraft can then be rolled on and off the trailer over the tracks 48 on the landing gear of the aircraft.

The amphibious aircraft trailer of the present invention serves as an interface of an amphibious aircraft between different mediums or modes of operation. While configured to operate on water, the amphibious aircraft can be launched or retrieved via the trailer, much like a boat trailer. Similarly the amphibious aircraft trailer can unload or load the aircraft on land when the aircraft is configured for land operations much like an all terrain vehicle. Additionally the present invention allows the aircraft to alter its configuration or mode of operation without the aircraft being removed from the trailer. By lifting the aircraft such that the landing gear can be extended, the amphibious aircraft trailer facilitates switching the configuration of the amphibious aircraft between that for both land and water operations.

Other embodiments of the present invention include additional features such as a pivoted trailer hitch receiver assembly that can be repositioned to reduce the overall length of the trailer for storage considerations. This repositioning of the hitch receiver assembly can be accomplished with the aircraft on the trailer while retaining the ability for the trailer/aircraft combination to be repositioned hitching to a vehicle. In other embodiment of the present invention a wireless remote winch can be employed to facilitate single person operations.

While there have been described above the principles of the present invention in conjunction with an amphibious aircraft trailer, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. An amphibious aircraft transportation system, comprising:
    an amphibious aircraft having a set of retractable landing gear;
    a frame supported on a wheel bearing axle for movements over a roadway surface, wherein the frame includes a plurality of wheel tracks;
    a cradle configured to engage and support the amphibious aircraft apart from the set of retractable landing gear; and
    a lift mechanism interposed between and coupled to the frame and the cradle and operable to displace the cradle and the amphibious aircraft vertically with respect to the frame such that the set of retractable landing gear associated with the amphibious aircraft can be extended while the amphibious aircraft is supported by the cradle so as to make contact with the plurality of wheel tracks when the cradle is lowered and, responsive to the set of retractable landing gear supporting the amphibious aircraft on the plurality of week tracks, operable to displace the cradle and the amphibious aircraft vertically such that the set of retractable landing gear can be retracted.

2. The amphibious aircraft transportation system of claim 1 wherein the amphibious aircraft includes a reconfigurable wing that can be positioned for flying operations or folded rearward for transportation and wherein the cradle supports the amphibious aircraft throughout various positions of the reconfigurable wing including when the reconfigurable wing is folded rearward for transportation.

3. The amphibious aircraft transportation system of claim 1 wherein the cradle can engage the amphibious aircraft while in a watercraft or waterborne mode.

4. The amphibious aircraft transportation system of claim 1 wherein the cradle comprises a plurality of bunks positioned to support the hull of the amphibious aircraft.

5. The amphibious aircraft transportation system of claim 1 wherein the cradle comprises a plurality of rollers positioned to support the hull of the amphibious aircraft.

6. The amphibious aircraft transportation system of claim 1 wherein the cradle is positioned apart from landing gear associated with the amphibious aircraft.

7. The amphibious aircraft transportation system of claim 1 wherein the set of retractable landing gear when extended is aligned with the plurality of wheel tracks and wherein a center wheel track aligned with a nose gear is displaced lower than wheel tracks on either side thereof to accommodate a keel of the amphibious aircraft.

8. The amphibious aircraft transportation system of claim 1 wherein the lift mechanism uses electro-mechanical components.

9. The amphibious aircraft transportation system of claim 1 wherein the lift mechanism uses electro-hydraulic components.

10. The amphibious aircraft transportation system of claim 1 wherein the lift mechanism uses pneumatic components.

11. The amphibious aircraft transportation system of claim 1 wherein the lift mechanism includes a platform to assist a user in lowering or raising the landing gear.

12. The amphibious aircraft transportation system of claim 1 further comprising a ramp rotationally coupled to a rear portion of the frame and aligned with the plurality of wheel tracks.

13. The amphibious aircraft transportation system of claim 12 wherein the ramp is operable to load and unload the amphibious aircraft from the amphibious aircraft trailer when on land.

14. A system for overland transportation of amphibious aircraft, comprising:
- an amphibious aircraft having a hull and a set of retractable landing gear;
- a frame having a front portion and a rear portion supported on a wheel bearing axle for movements over a roadway surface, wherein the frame includes one or more surfaces operable to support the set of retractable landing gear in an extended configuration;
- a cradle configured to engage and support the hull of the amphibious aircraft apart from the set of retractable landing gear associated with the amphibious aircraft; and
- a lift mechanism coupled to and interposed between the cradle and the frame wherein the lift mechanism is operable to vertically displace the amphibious aircraft such that the amphibious aircraft can be reconfigured to be supported by either the cradle or the set of retractable landing gear.

15. The system of claim 14 wherein the cradle is operable to load and unload the aircraft during land or water operations.

16. The system of claim 14 wherein responsive to the amphibious aircraft being supported by the set of retractable landing gear on the one or more surfaces, the lift mechanism is operable to vertically displace the amphibious aircraft away from the one or more surfaces such that the set of landing gear can be retracted and wherein responsive to the amphibious aircraft being supported by the hull on the cradle, the lift mechanism is operable to vertically displace the amphibious aircraft such that set of landing gear in an extended state can support the amphibious aircraft on the one or more surfaces.

* * * * *